United States Patent [19]

Giammarco et al.

[11] 3,897,227
[45] July 29, 1975

[54] PROCESS FOR THE REMOVAL OF CARBON DIOXIDE AND/OR HYDROGEN SULPHIDE AND OTHER ACIDIC GASES FROM GAS MIXTURES

[75] Inventors: Giuseppe Giammarco; Paolo Giammarco, both of Venice, Italy

[73] Assignee: Vetrocoke Cokapuania S.p.A., Venezia Porto Marghera, Italy

[22] Filed: Apr. 26, 1973

[21] Appl. No.: 354,729

[30] Foreign Application Priority Data
Apr. 26, 1972 Italy .................................. 68286/72

[52] U.S. Cl. .......................... 55/68; 55/73; 55/89; 423/229
[51] Int. Cl. ........................................... B01d 53/14
[58] Field of Search ............. 55/68, 73, 84, 89, 228, 55/229; 423/220, 229

[56] References Cited
UNITED STATES PATENTS
3,225,519  12/1965  Stotler ..................................... 55/68

Primary Examiner—Charles N. Hart
Attorney, Agent, or Firm—Sughrue, Rothwell, Mion, Zinn & Macpeak

[57] ABSTRACT

A new process for the removal of carbon dioxide and/or hydrogen sulphide and other acidic gases from gas mixtures in an absorption stage, in which the gas mixture to be purified is brought into contact with an absorption solution, and a regeneration stage, in which the gases absorbed in the absorption solution are removed, characterized in that a combustible substance is burnt in direct contact with the absorption solution to be regenerated, the combustion gases are mixed with the water vapour produced by the heat of combustion, and this gas mixture is brought into contact with the absorption solution to be regenerated.

5 Claims, 5 Drawing Figures

PROCESS FOR THE REMOVAL OF CARBON DIOXIDE AND/OR HYDROGEN SULPHIDE AND OTHER ACIDIC GASES FROM GAS MIXTURES

The invention relates to a process for the removal of carbon dioxide and/or hydrogen sulphide and other acidic gases from gas mixtures with regeneration of the absorption solutions by treatment with combustion gases.

Two basic processes are known for the regeneration of absorption solutions containing gaseous impurities:

a. Treatment of the absorption solution to be regenerated in a so-called regeneration tower or column in countercurrent with steam, which is generally obtained by heating the absorption solution itself to its boiling point. For this purpose a reboiler, which is externally heated with steam, is installed at the base of the tower.

b. Treatment of the absorption solution to be regenerated with air in accordance with the processes described in Italian Pat. Nos. 470 758, 518 145, and 545 908. The absorption solution to be regenerated is heated with a heater that is externally heated with steam or some other heat carrier, and is then treated with air in the regeneration tower to effect desorption.

The two known processes consist essentially in that a combustible substance is burnt in a boiler, whereupon steam is formed with a thermal efficiency of 85 to 90 percent, and that the steam produced in this way is used in the reboiler or in the heater of the regeneration tower.

The aim of the invention is to provide a process for the removal of carbon dioxide and/or hydrogen sulphide and other acidic gases from gas mixtures with regeneration of the absorption solutions that is simpler and cheaper to operate than the known processes and has a substantially lower heat consumption for the regeneration of the absorption solutions. This aim is achieved by the invention.

The object of the invention is accordingly a process for the removal of carbon dioxide and/or hydrogen sulphide and other acidic gases from gas mixtures in an absorption stage, in which the gas mixture to be purified is brought into contact with an absorption solution, and a regeneration stage, in which the gases absorbed in the absorption solution are removed by heating the solution, characterized in that a combustible substance is burnt in direct contact with the absorption solution to be regenerated, the combustion gases are mixed with the water vapour produced by the heat of combustion, and this gas mixture is brought into contact with the absorption solution to be regenerated.

In the process of the invention, therefore, a suitable absorption solution is circulated between an absorption stage and a regeneration stage. In the absorption stage, the solution is brought into contact with the gas mixture to be purified, whereupon acidic gaseous impurities are removed. In the regeneration stage, the absorption solution to be regenerated is treated in the warm with water vapour and combustion gases having a desorbent action, with an external supply of heat, to remove the gaseous impurities absorbed in the absorption solution. The nature of the absorption solution used depends on the nature of the acidic gases that are to be separated from gas mixtures. The process of the invention is particularly suitable for the separate or simultaneous absorption of gaseous impurities such as $CO_2$, $H_2S$, or HCN by the use of aqueous alkali metal carbonate solution, which may be activated by the addition of $As_2O_3$, glycine or other amino acids, ethanolamines, boric acid, or similar activating substances, aqueous solutions of alkali metal salts of amino acids (Alkazid process), solutions of ethanolamines in water or in organic solvents, or solutions of alkali metal phosphates, phenoxides, or borates.

In the process of the invention, a combustible substance is burnt in direct contact with the absorption solution to be regenerated. The term "combustion of the combustible substance in direct contact with the absorption solution to be regenerated" means that the flame formed during the combustion is brought into physical (true) contact with the absorption solution and/or the absorption solution is heated at least by direct radiant heat. The resulting heat of combustion is used directly for the production of water vapour (steam) from the absorption solution itself. The water vapour (steam) mixed with the combustion gases is brought into contact with the absorption solution and used for the removal of the gaseous acidic impurities absorbed in this solution. As can be seen from the following, the combustion of the combustible substance may also be carried out in direct contact with water.

The properties of the desorbent gas mixtures of water vapour and combustion gases are listed in Table I, together with various fuels.

The process of the invention has, inter alia, the important economic advantage that it operates without a boiler for the production of steam or the reboiler or heater in which the steam is used in the regeneration tower.

Another advantage of the process of the invention is that the heat consumption in the regeneration stage is considerably decreased. The two main reasons for this are as follows:

As was mentioned earlier, a gas mixture consisting of water vapour and combustion gases is used for the regeneration of the exhausted absorption solution. It is well known that the individual gaseous components of the combustion gases are quite as effective as water vapour in the description, but no corresponding heat consumption is required for their production. It can be seen from column 1 of Table I, for example, that the desorbent gas mixutre consists of 65 to 68 vol. percent of water vapour and 32 to 35 vol. percent of combustion gases, i.e. that a heat consumption for only 65 to 68 parts by volume of water vapour gives a description capacity of 100 parts by volume.

TABLE I

| FUEL | 1 Water vapour, vol. % | Combustion gas, vol. % | 2 Dew point, °C | 3 Composition of the desorbent gas mixture, vol. % | | |
|---|---|---|---|---|---|---|
| Hydrogen | 66.8 | 33.2 | 93.1 | $H_2O = 78.3$; | $N_2 = 21.7$; | $CO_2 = 0$ |
| Methane | 65 | 35 | 90.8 | $H_2O = 71.34$; | $N_2 = 25.3$; | $CO_2 = 3.36$ |
| Naphtha (C = 88%; $H_2 = 12\%$) | 67.3 | 32.7 | 90.7 | $H_2O = 71.12$; | $N_2 = 24.3$; | $CO_2 = 4.58$ |
| Waste gas from ammonia synthesis ($H_2 = 65\%$; $CH_4 = 10\%$; $N_2 = 20\%$; Ar = 5%) | 65.7 | 34.3 | 91.5 | $H_2O = 73.06$; | $N_2 = 25.2$; | $CO_2 = 1.16$ Argon = 0.58 |
| Coal | 66.6 | 33.4 | 89.1 | $H_2O = 66.6$; | $N_2 = 26.4$; | $CO_2 = 7$ |

The second reason is that owing to the presence of the combustion gases, the temperature of the desorbent gas mixture is about 90°C, as can be seen from column 2 of Table I. The regeneration column in the process of the invention consequently has a maximum temperature of about 90°C.

The heat consumption for heating the exhausted absorption solution in the regeneration stage is therefore distinctly smaller than the corresponding heat requirement for regeneration with steam in accordance with the known method mentioned under a) above, in which the exhausted absorption solution must be heated to 110° to 115°C.

It should also be pointed out that in the process of the invention, the absorption solution to be regenerated is introduced into the regeneration tower at a temperature of about 80° to 85°C. This absorption solution undergoes no significant temperature change as a result of the decrease in pressure (flash) that occurs on transition from one phase to the other i.e. the absorption stage to the regeneration stage. In the known processes, the solution preheated by heat exchangers to a temperature of about 100°C or the solution that emerges from the absorption tower, as in the isothermal absorption-regeneration cycles, at a temperature of about 105° to 110°C undergoes a decrease in pressure, as a result of which the temperature generally falls to 90° to 92°C. It is known that the water vapour liberated during this decrease in pressure has only a weak desorbent action. Finally, in the known processes, there is a considerable heat consumption for heating the solution along the regeneration tower from 90° to 92°C to about 110° to about 115°C.

It follows from the above remarks that the heat consumption for the regeneration of the absorption solution in the process of the invention is at least 50 percent less than in the process in which the absorption solution is heated to its boiling point. In the practical execution of the process of the invention, a consumption of 400 to 600 kcal/Nm$^3$ of absorbed $CO_2$ is generally found. It should be noted, however, that this is based on the theoretical calorific values of the fuel, and heat losses in the equipment, e.g. in the boiler or heater, are not taken into account.

Another advantage of the process of the invention is that the temperature of the regeneration stage is very close to the temperature of the absorption stage, and this leads to substantial simplification of the heating equipment of heat exchangers fitted between the two stages. This advantage is particularly important if ethanolamine solutions or solutions of alkali metal salts of animo acids are used for absorption, particularly in the absorption of $H_2S$, where absorption temperatures of about 40° to 60°C are necessary.

The temperature of the regeneration stage may coincide with the temperature of the absorption stage, and this leads to a more advantageous isothermal absorption-regeneration cycle than in the known processes, in which the regeneration temperature is not lowered as in the process of the invention, but the absorption temperature is raised instead to 105° to 115°C, which is a disadvantage. These temperatures are above the optimum absorption temperatures.

An additional advantage of the process of the invention is that the disadvantage of alteration and degradation of the absorption solutions by oxidation of some of the compounds present in them is avoided. This oxidation is due to the use of air for desorption in accordance with the known method mentioned under b) above.

It is known that alkali metal carbonate solutions activated by the addition of $As_2O_3$ (arsenite solutions) lose their absorbent action as a result of oxidation of the arsenite to arsenate. The arsenate must be removed from the solutions.

It is also knwon that ethanolamine solutions or alkali metal carbonate solutions activated by addition of ethanolamines and solutions of alkali metal salts of amino acids cannot be used for the purification of gases containing molecular oxygen because of the above-mentioned oxidation by such gases, even if they contain only small quantities of oxygen. However, alkali metal carbonate solutions activated by the addition of glycine are more resistant to oxidation.

Finally, it is known that in the case of gas mixtures containing $H_2S$, a slow conversion of the alkali metal sulphides (formed by absorption of $H_2S$) into thiosulphates occurs under the action of oxygen, particularly when air is used as the desorbent. The solution therefore undergoes a change of composition, and must be renewed from time to time.

In the process of the invention, these disadvantages are avoided by the fact that the fuel is burnt with exactly the stoichiometric quantity of air (or other gases containing molecular oxygen, even when these contain less than 21 percent of oxygen) required for combustion, so that any excess of air is avoided and a completely oxygen-free combustion gas is formed. Combustion devices are known that produce combustion gases with an oxygen content of less than 50 ppm.

The use of the combustion gases as desorbent gases has not been suggested or carried out before. This is due to the general view that the high $CO_2$ content of these combustion gases inhibits the elimination of $CO_2$ from the absorption solutions in which $CO_2$ has previously been absorbed.

In the process of the invention, the separation of $CO_2$ from the absorption solution to be regenerated is made possible by the fact that the combustion gases are mixed with an excess of water vapour, so that the $CO_2$ concentration in the desorbent gas mixture is reduced to 1.2 to 4 percent; cf. of column 3 of Table I, as well as the lower values reported below.

To determine the degree of regeneration obtained on treatment of a number of absorption solutions with gas mixtures consisting of water vapour and combustion gases by the method of the invention, two series of experiments are carried out.

The first series of experiments is carried out with a combustion gas having a $CO_2$ content of about 10 percent at ambient temperature. This corresponds to a combustion gas obtained on combustion of methane or of natural gas consisting mainly of methane. This combustion gas is saturated with water vapour at various temperatures by treatment with warm water or aqueous solutions. In this way one obtains gas mixtures consisting of water vapour and combustion gases in which the $CO_2$ concentration decreases with rising temperature (dew point) and increasing content of water.

The drawings illustrate graphs and different devices for removing acid gases from a gas stream.

Figure 1:
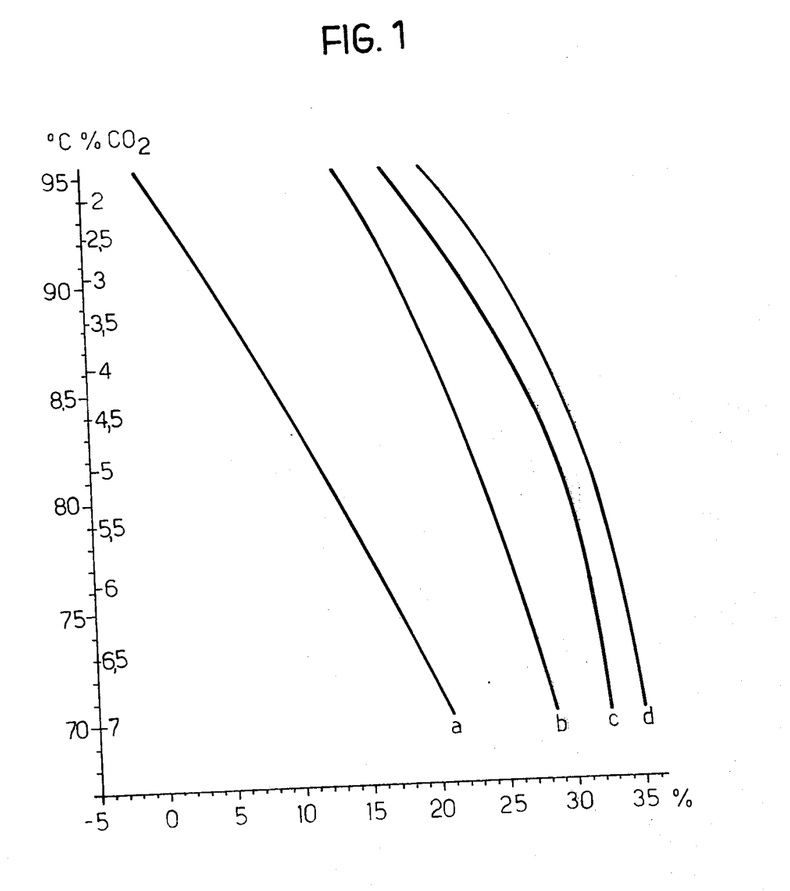

In the diagram of FIG. 1, the ordinate represents the temperature of the desorbent gas mixture. It shows how the $CO_2$ concentration decreases from its initial value of 10 percent as a result of the increasing quantities of water vapour. The abscissa shows the $CO_2$ saturation concentration (carbonation degree) reached after the experiment, i.e. after the treatment of the absorption solution to be regenerated with the desorbent gas mixture.

The regeneration temperature in the present experiments is exactly the same as the temperature of the desorbent gas mixture. It should be noted, however, that experience has shown that the temperature of the absorption solution to be regenerated is appreciably higher (about 3°C) than the temperature of the pure water vapour contained in the desorbent gas mixture. The individual curves a) to d) in the diagram of FIG. 1 relate to the various aqueous solution (a) to (d) having the composition as stated below used in the experiments. These are the solutions most commonly used for the removal of $CO_2$ from gas mixtures. Other absorption solutions behave similarly.

It can be seen from the diagram that for all the solutions investigated, the $CO_2$ saturation degrees required in modern purification technology are readily reached by regeneration with a gas mixture of water vapour and combustion gases.

For example, when methane is used as the fuel, the process of the invention yields a gas mixture having a $CO_2$ content of 3.36 percent and a saturation temperature of 90.8°C (dew point). When the regeneration is carried out at this temperature, the following degrees of regeneration are attained:

| | | |
|---|---|---|
| (a) | arsenite solution ($K_2O$ = 200 g/litre; $As_2O_3$ = 140 g/litre): | 3.5% |
| (b) | solution of glycine and boric acid ($K_2O$ = 250 g/litre; glycine = 50 g/l; boric acid = 10 g/l): | 17% |
| (c) | glycine solution ($K_2O$ = 250 g/l; glycine = 50 g/l): | 21.6% |
| (d) | solution activated with diethanolamine ($K_2O$ = 250 g/l; diethanolamine = 30 g/l): | 24.6% |

All these values satisfy the practical requirements.

A second series of experiments is carried out with a combustible gas, defined in Table I above as waste gas from ammonia synthesis, yielding combustion gases having a $CO_2$ content of about 5 percent. Such combustion gases may be obtained by combustion of a purified waste gas of the average composition $H_2$ = 63 percent; $CH_4$ = 12 percent; $N_2$ = 20 percent; argon 5 percent obtained in the ammonia synthesis.

(In the ammonia synthesis the desulphurized mixed gas used which besides nitrogen and hydrogen contains considerable quantities of carbon monoxide and carbon dioxide is catalytically converted with steam. Carbon monoxide is thus used for the production of additional quantities of hydrogen. After separation of the carbon dioxide the gas is distilled by fractionation. One obtains a synthesis gas fraction ($N_2$ + 3 $H_2$) and the waste gas fraction of the composition as stated above). The combustion gas obtained from the waste gas is particularly suitable for use in the process of the invention, owing to its low $CO_2$ content. In modern ammonia synthesis plants the available quantities of waste gas are sufficient for regeneration of the solution used for the $CO_2$ removal from the converted gas.

Figure 2:
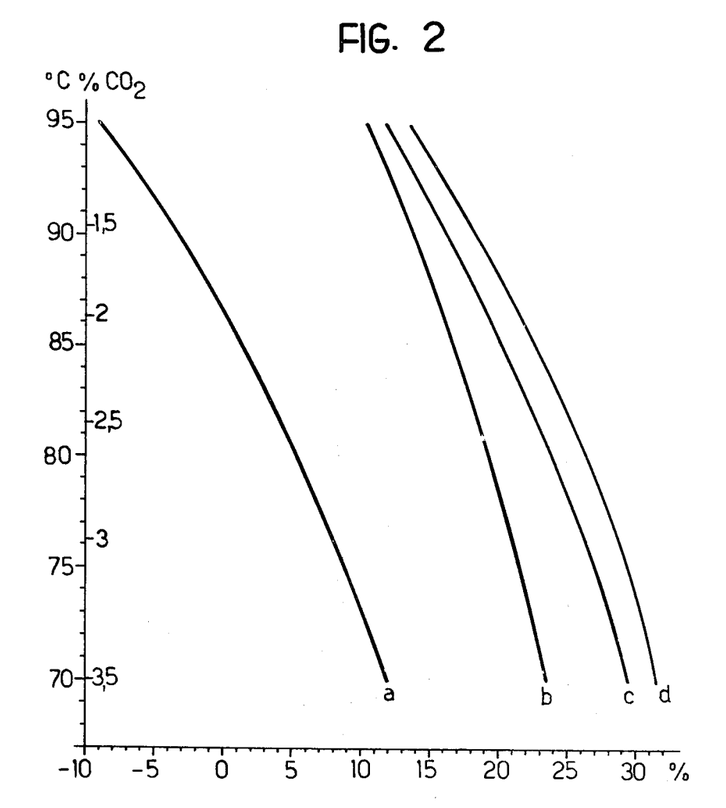

The corresponding results are shown in the diagram of FIG. 2. The curves a) to d) refer to the aqueous solutions (a) to (d) used in the tests and having the composition as stated below. It can be seen that on combustion of the said purified waste gas, one obtains a gas mixture having a $CO_2$ content of 1.33 pecent at a temperature (dew point) of 91.4°C. The following degrees of regeneration are attained:

| | | |
|---|---|---|
| (a) | arsenite solution ($K_2O$ = 200 g/l; $As_2O_3$ = 140 g/l): | 5.4% |
| (b) | solution of glycine and boric acid ($K_2O$ = 250 g/l; glycine = 50 g/l; boric acid = 10 g/l): | 13% |
| (c) | glycine solution ($K_2O$ = 250 g/l; glycine = 50 g/l): | 15% |
| (d) | solution activated with diethanolamine ($K_2O$ = 250 g/l; diethanolamine = 30 g/l): | 17% |

These values are distinctly better than those obtained in the first series of experiments, and are perfectly adequate for practical purification purposes.

Further experiments are carried out with various ethanolamine solutions. It is found that these solutions can also be regenerated to an adequate degree by the process of the invention. However, the numerical results as a function of the duration of the experiment show certain discrepancies with respect to the values given in the literature for the $CO_2$ partial pressure of ethanolamine solutions in final equilibrium (cf. Danckwerts & Sharma, "The Chemical Engineer," October 1966, pp.CE256 and CE258).

FIGS. 1 and 2 show the experimental results obtained over a wide temperature range. It can be seen that the degree of regeneration obtained on alteration of the temperature of the desorbent gas mixture is either increased, as e.g. when further water vapour is supplied from outside, or reduced, as e.g. when the solution to be regenerated is introduced into the regeneration tower at an insufficient temperature.

The presence of $CO_2$ in the desorbent gas mixture evidently presents no obstacle in purification processes whose purpose is the removal of $H_2S$, HCN, or gaseous acidic impurities other than $CO_2$. In the case of $H_2S$, in fact, the presence of $CO_2$ in the liquid desorbent favours the removal of $H_2S$. This is chemically easy to understand, since $CO_2$ is a stronger acid than $H_2S$, and consequently liberates the latter.

When hydrogen is used as the fuel gas, the combustion gas contains no $CO_2$.

The fuel may also be burnt with any other gas mixture containing oxygen instead of with air. Gas mixtures having oxygen contents of less than 21 percent and especially those with very low oxygen contents, are particularly important. Examples of such mixtures are impure nitrogen with an oxygen content of 2 to 6 percent, which is obtained as a by-product in the distillation of liquid air at low temperatures, and combustion gases with oxygen contents of generally 2 to 5 percent, part of whose sensible heat has already been used in heating equipment.

In the practical execution of the process of the invention, these gas mixtures with low oxygen contents are mixed with preferably gaseous fuel, the quantity of fuel being in the appropriate ratio to the oxygen content. They are then passed into a combustion chamber, where complete combustion is carried out, preferably in the presence of catalysts.

It is advantageous in some cases to raise the temperature of the combustion chamber by introducing combustion gases at higher temperatures obtained by combustion of a small quantity of the fuel gas. Oxygen-free desorbent mixtures are formed in this way, particularly if an excess of fuel gas is used in the combustion.

In the above-mentioned use of gases having low oxygen contents, it is advantageous, as already known, to keep the temperature in the regeneration tower constantly in the range between 85° and 90°C, additional heat being supplies to the regeneration stage. This is achieved e.g. by heating the solution to be regenerated before it enters the regeneration tower or by treatment of the gases emerging from the combustion chamber with warm water in the so-called quenching chamber as described below.

Figure 3:
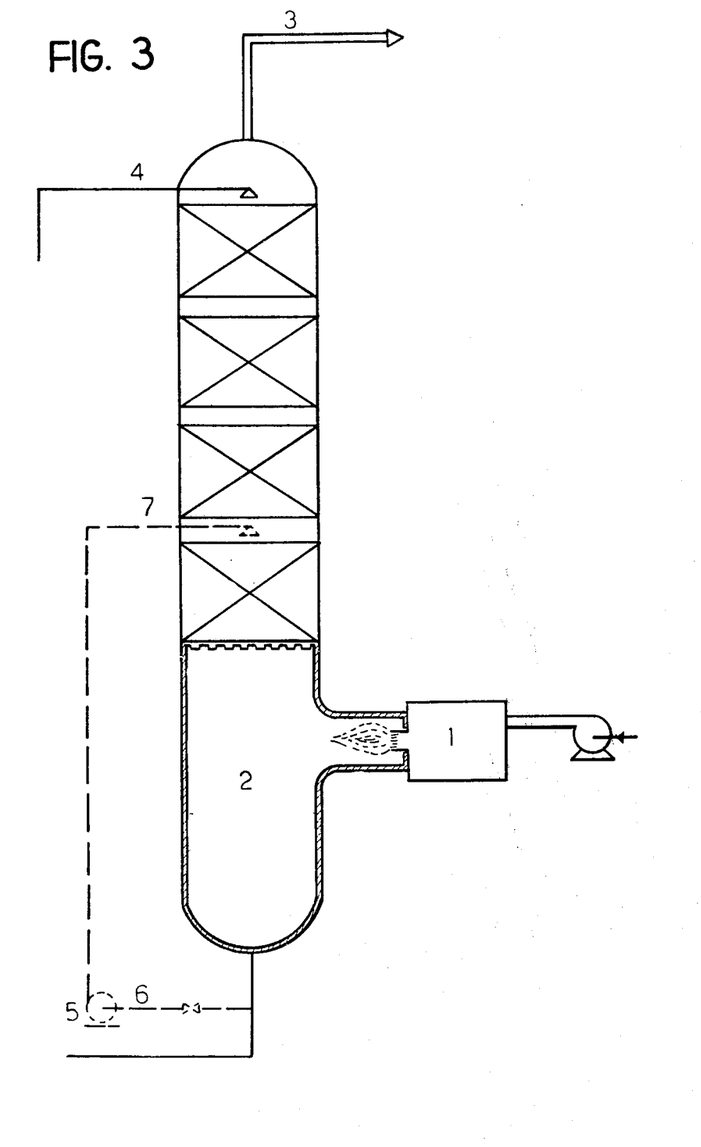
Figure 4:
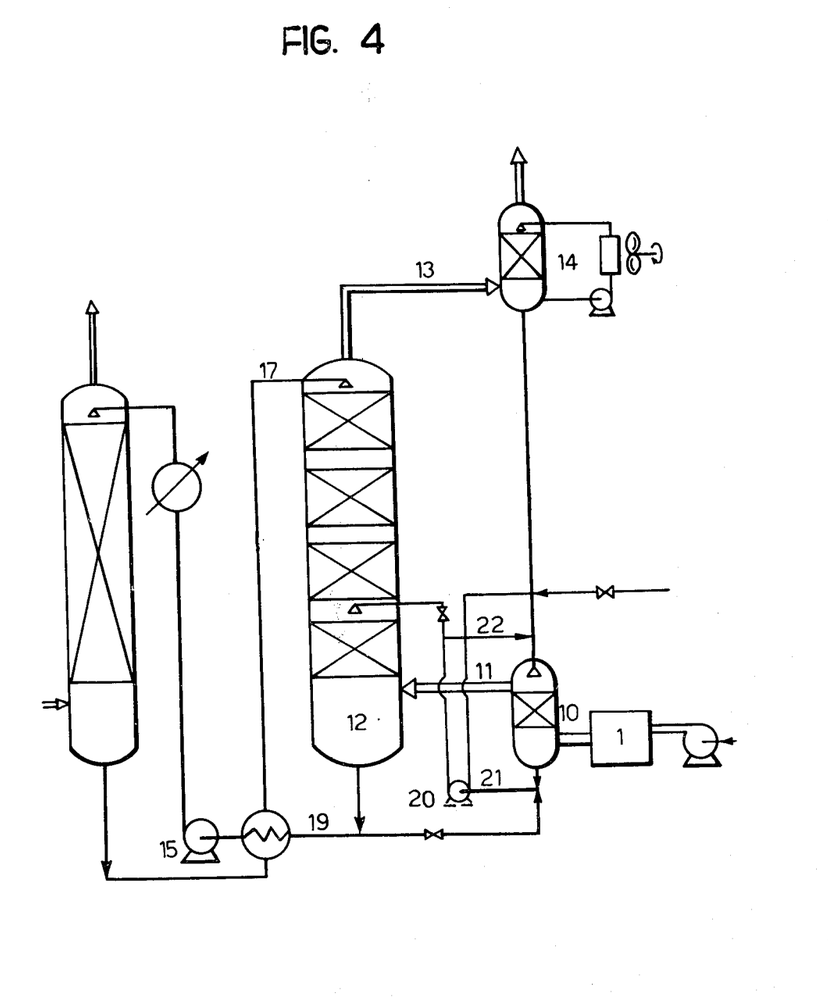
Figure 5:
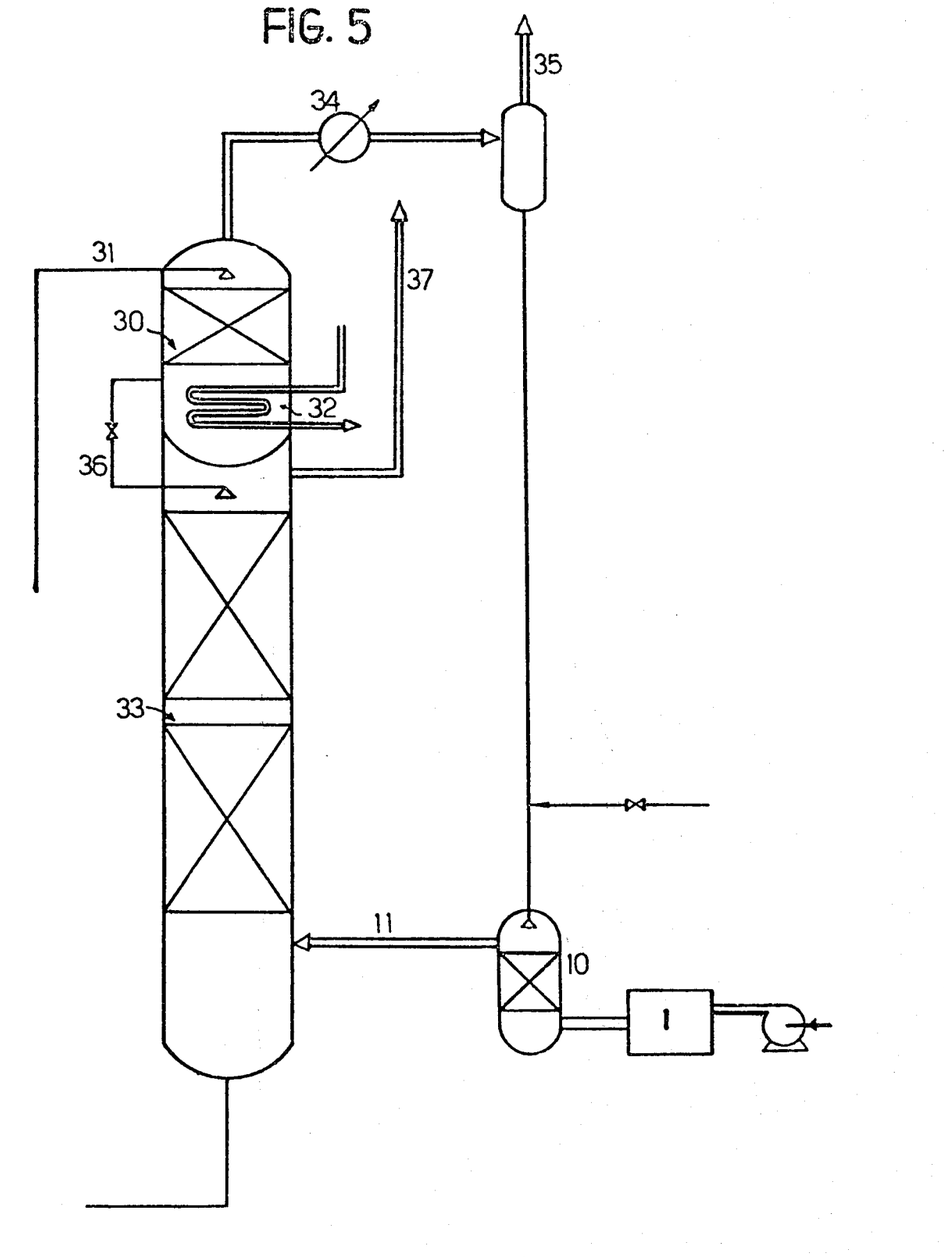

FIGS. 3 to 5 illustrate preferred equipment for the execution of the process of the invention.

FIG. 3 shows schematically a regeneration tower for use in the process of the invention. It is a packed tower or a tower provided with other devices that allow contact between the liquid and the flowing desorbent.

At the base of the tower is a combustion zone 1, in which a combustible substance is burnt together with air. Since the combustion gas must be as free from oxygen as possible, burners having a premixing chamber for the fuel (liquid or gaseous) and the combustion air are preferred. Special electronically controlled devices that allow the production of combustion gas having an oxygen content of less than 50 ppm are known.

The combustion gases are led directly at very high temperatures into the lower part of the regeneration tower (vaporization zone 2), which is constructed from a heat-resistant material. In this zone 2, the combustion gases are brought into contact with an absorption solution descending from above, whereupon part of the water contained in the solution evaporates. The contact between the combustion gases and the absorption solution in the zone 2 may be intensified by means of packing bodies made from heat-resistant material that is also resistant to the solution (stainless steel or special alloys). This contact can also be improved by withdrawing part of the solution from the lower part of the tower and returning it to the tower via the pipes 6 and 7 by means of the pump 5. The mixture of water vapour and combustion gases that is formed rises in the regeneration tower in countercurrent to the absorption solution, regenerates the latter, and is finally removed through the pipe 3.

The absorption solution to be regenerated is introduced at the top of the regeneration tower through the pipe 4. The temperature of the absorption solution is chosen according to normal known principles. Since the solution must have a temperature of about 90°C, which roughly corresponds to the temperature of the desorbent gas mixture, at the base of the tower, the solution is generally introduced into the tower at a temperature (about 80° to 85°C) such that it reaches the above-mentioned temperature at the base of the tower.

FIG. 4 shows schematically a particularly preferred apparatus for the execution of the process of the invention. The combustible substance in the case is burnt in direct contact with water. The resulting mixture of water vapour and combustion gases is then brought into contact with the absorption solution to be regenerated in order to remove the absorbed gaseous acidic impurities from the solution. This equipment has numerous practical advantages, and among other things it enables the combustion zone to be situated at some distance from the regeneration zone and to be separated from the latter.

In FIG. 4, 1 is a combustion zone, which has a burner with a premixing chamber for fuel and combustion air. Special monitoring and control devices allow the production of oxygen-free combustion gases.

The combustion gases are introduced at very high temperatures into the quenching chamber 10, which is constructed from a material that is resistant to the high temperatures and the corrosive action of the humid combustion gases. In this chamber, the combustion gases are brought into contact with water, which is sprayed in or distributed on packing material. The water in this case is preferably recirculated by means of the pump 20 through the pipes 21 and 22. The water introduced into the quenching chamber 10 corresponds to the quantity of water that is normally added in purification processes to keep the concentration of the absorption solution constant. If the water balance makes it necessary, the pump may also recirculate part of the solution withdrawn from the regeneration tower together with the water.

In the quenching chamber 10, one obtains a mixture of water vapour and combustion gases, which generally has a maximum content of water vapour, i.e. all the heat of combustion is used for the production of water vapour. However, the gas mixture can also be kept in the super-heated state if this is necessitated by the water weight balance. The mixture of water vapour and combustion gases is introduced through the pipe 11 into the base of the regeneration tower 12, where it regenerates the descending solution in countercurrent, and is finally removed at the top of the tower through the pipe 13. The regeneration tower 12 is an ordinary packed tower.

It may occasionally be advantageous for the gas stream emerging at the top of the regeneration tower 12 through the pipe 13 to be cooled in a cooler 14. Part of the water vapour contained in the gas stream is thus condensed. This condensation water is led to the quenching chamber 10. The water introduced into the quenching chamber 10 advantageously has a temperature as close as possible to the temperature range of 80° to 90°C. If necessary, this water may be heated with part of the desorbent gas mixture itself.

As was mentioned earlier, the regenerated solution at the base of the tower 12 has a temperature of about 90°C. This solution is fed into the absorption tower 16 by means of the pump 15. The absorption tower is a packed tower or a tower provided with other contact devices.

For the absorption of $CO_2$, the regenerated solution is led in many cases directly to the absorption tower without intermediate cooling, i.e. at a temperature of about 90°C. However, the temperature of the solution is raised by a few degrees at the bottom of the absorption tower by the heat of reaction (depending on the temperature at which the gas mixture to be purified is led to the absorption tower), and is then fed directly back into the regeneration tower 12 through the pipe 17, without the intervention of heating devices, to complete the cycle. The particularly advantageous isothermal absorption-regeneration cycle mentioned earlier is achieved in this way.

In other cases, e.g. in the absorption of $H_2S$ or if very fast removal of $CO_2$ is desired, it is necessary to reduce the absorption temperature to about 40° to 60°C. In this case, the regenerated solution is cooled by means of the cooler 18 (in the so-called split-stream cycle, only part of the solution is cooled). The exhausted solution emerging from the absorption tower is heated e.g. in a heat exchanger 19 and then fed into the top of the regeneration tower 12.

FIG. 5 shows a modification of the equipment for use in accordance with the invention, by means of which part of the $CO_2$ and/or $H_2S$ contained in the gas mixture to be purified can be obtained in the pure state and used elsewhere.

The regeneration tower is divided into two parts. The upper part consists of a conventional regeneration tower 30 for desorption with water vapour. The solution introduced at the top of the tower through the pipe 31 is led in countercurrent to the water vapour used for stripping, and is brought into contact with the latter by means of packing. The water vapour used for stripping is produced in a known manner at the bottom of the tower by means of the reboiler 32, which is fed from outside with steam of with hot process gas.

In this tower 30, the solution is regenerated only in part, i.e. to a degree that is sufficient to allow only part (generally about half) of the absorbed $CO_2$ to be obtained in the pure state via the cooling device 34 and the pipe 35. In this case the boiling point of the solution at the bottom of the tower is only 90°C. This is generally achieved in practice with a heat supply of about 16 to 20 kg of steam/m³ of solution.

The solution is then withdrawn at the bottom of the tower 30 and fed through the pipe 36 into the lower tower 33, in which the regeneration is completed in the manner described earlier by desorption with a mixture of water vapour and combustion gases. The permanent gases from the combustion gas and the $CO_2$ removed from the solution are withdrawn through the pipe 37.

A number of modifications are possible in the process of the invention.

One possible modification is to introduce hot water, preferably at a temperature of 95° to 98°C, into the quenching chamber 10 of FIG. 4. In this way, the concentration of water vapour in the desorbent gas mixture is increased, while the $CO_2$ concentration is decreased.

For example, the desorbent gas mixture obtained after combustion of methane has a $CO_2$ content of 1.96 percent or 0.82 percent, according to whether the temperature of the water fed into the quenching chamber is 95° or 98°C. The $CO_2$ content of the desorbent gas mixture obtained from inert synthesis gases decreases to 0.82 percent or 0.34 percent. In this way, the $CO_2$ content in the desorbent gas mixture is further reduced, and an even better degree of regeneration of the solution is obtained.

Condensation water or other available hot aqueous liquids may also be used as the hot water led into the quenching chamber 10. This hot water can also be produced in a boiler operated with combustion of the fuel used in the process of the invention.

A further modification of the process of the invention consists in adding water vapour to the combustion air and the fuel gas before the combustion; e.g. by treatment with hot water. This again leads to an increase in the concentration of water vapour in the desorbent gas mixture, while the $CO_2$ concentration decreases. For example, if methane is used as the fuel gas, on saturation of the methane and of the combustion air at 80°, 85°, and 90°C, the $CO_2$ content of the desorbent gas mixture is reduced to 2.55, 2.3, and 1.77 percent respectively. When purified waste gas is used and saturation is carried out at 80°, 85° and 90°C, the $CO_2$ content of the desorbent gas mixture falls to 0.85, 0.75, and 0.61 percent respectively. In this case, the $CO_2$ content is practically negligible, and even better degrees of regeneration are achieved in the solution.

A further modification consists in the reverse of the embodiment in accordance with FIG. 5. In this case the absorption solution to be regenerated is first regenerated with the gas mixture of water vapour and combustion gases, and the regeneration is then completed in a conventional tower with desorption by means of water vapour produced by reboiling.

Finally, the solution to be regenerated may be treated during its descent in the regeneration tower with the desorbent gas mixture, which is introduced at a point between the top of the tower and the base of the tower or at the base of the tower. The desorbent gas mixture introduced at a point between the top and the base of the tower may be obtained e.g. from the combustion of methane or other fuel gases with high contents of carbon, while the gas mixture introduced at the base of the tower is preferably obtained from the combustion of hydrogen or purified waste gas, which contains much less carbon. In this case, a better degree of regeneration of the solution is obtained.

The process of the invention may be carried out both in one-stage and in two-stage cycles in accordance with the procedures normally used. However, these procedures are modified in such a way that the supply of heat is carried out at the base of the regeneration tower by the introduction of the desorbent mixture of water vapour and combustion gases, whereas a reboiler is used in the conventional processes.

The examples illustrate the invention.

EXAMPLE 1

Natural gas in a quantity of 130,000 m³/hour, which contains 11 percent of $CO_2$ and otherwise practically consists of methane, is purified to a final $CO_2$ content of 1.5 percent with a potassium carbonate solution activated with 50 g of glycine/litre at a pressure of 60 atm. The purification plant corresponds to the equipment shown in FIG. 4.

The following considerations are used in the choice of the dimensions of the absorption tower 16: Partial pressure of $CO_2$ in the gas/partial pressure of $CO_2$ in the liquid 2:1. A solution with a $CO_2$ saturation of 37 percent introduced into the absorption tower 16 at 70°C is consequently sufficient for purification to 1.5 percent of $CO_2$.

At the base of the absorption tower 16, where the gas has a partial pressure of 6.6 atm, a $CO_2$ saturation of 87 percent is reached. The change in the $CO_2$ saturation is therefore $87 - 37 = 50$, which corresponds to a specific loading of the solution of 29.7 vol. of $CO_2$/vol. of solution.

In the absorption tower 16, the solution temperature is kept constant at about 70°C, the heat of reaction covering the heat requirement for raising the temperature of the natural gas, which is introduced at about 25°C, to the exit temperature of 70°C.

The exhausted solution emerging from the absorption tower 16 is fed into the top of the regeneration tower 12 and passed downwards in countercurrent to the combustion gases.

The burner 1 (cf. FIG. 4) is fed with purified methane, which is removed from the top of the absorption tower at 60 atm. The burner operates on the premixing principle, and a combustion gas having an oxygen content of 50 ppm is obtained. None of the glycine used as the activator is therefore consumed by oxidation. This combustion gas is passed into the quenching chamber 10, in which it is treated with sprayed water or water finely distributed on suitable packing material, so that the heat of combustion is used for evaporation of the water until saturation is reached. The water serves to replace the water losses and to maintain constant concentrations in the solution. It may be obtained from the cooler 14. It is even better if hot water or condensation water can be used for the quenching, so that further heat can be supplied to the combustion gases.

If one considers that methane has a calorific value of about 8500 kcal/Nm$^3$, it can be calculated that after quenching one obtains a gas mixture containing about 3 percent of $CO_2$, 26 percent of nitrogen, and about 71 percent of $H_2O$, whose dew point is about 90°C. The quantity of heat to be supplied to the regeneration tower 12 is 6.54 million kcal/hour, which corresponds to a consumption of 770 m$^3$ of methane/hour with a lower calorific value of 8500 kcal/Nm$^3$. The following can be calculated from this: the heats of reaction for the absorbed 12,500 Nm$^3$ of $CO_2$/hour is 3.54 million kcal/hour. The remaining 3.00 million kcal/hour is consumed for the water vapour that accompanies the $CO_2$ and the inert gases formed in the combustion of methane. The gases, saturated with water vapour are removed at a temperature of about 66°C at the top of the regeneration tower 12. This temperature is quite permissible under the heat conditions prevailing at the top of the regeneration tower 12.

The total heat supply is 520 kcal/Nm$^3$ of $CO_2$. This quantity of heat is based on the calorific value of the fuel. The associated costs are about half of the costs arising when steam is used.

The solution activated with glycine is not oxidized during the process; this is due to the fact that the combustion gases are practically free from oxygen.

EXAMPLE 2

Converted gas in a quantity of 130,000 m$^3$/hour and with an initial $CO_2$ content of 20 percent, which is saturated with water vapour at 120°C, is brought to a pressure of 30 atm. This gas stream is purified to a final $CO_2$ content of 0.1 percent. The absorption solution consists of an aqueous potassium arsenite solution (200 g of $K_2O$/litre and 140 g of $As_2O_3$/litre.

The absorber operates by the split-stream process, i.e. one third of the stream is fed at 60°C into the top of the absorption tower 16 and the remaining two thirds are introduced at 90°C into the absorption tower at a point in its central part. To obtain a purification to 0.1 percent of $CO_2$ at a temperature of 60°C, the ratio of the partial pressure of $CO_2$ in the gas to the partial pressure of $CO_2$ in the solution being maintained at 2:1, it is necessary to introduce the solution with a $CO_2$ saturation of 5 percent.

At the base of the absorption tower 16, the solution temperature is about 95°C, because of the heat of reaction and the sensible heat of the gas saturated with water vapour introduced at 120°C. Corresponding to this temperature, one attains a final $CO_2$ saturation of 68 percent, which corresponds to a specific leading of the solution of 30 vol. of $CO_2$/vol. of solution. The flow rate of the solution is 860 m$^3$/hour.

The exhausted absorption solution emerging from the absorption tower 16 at a temperature of 95°C is introduced into the top of the regeneration tower 12 in accordance with Example 1 in countercurrent to the combustion gases that come from the burner 1 (combustion of methane) and are then treated in the quenching chamber 10. These gases saturated with water vapour are introduced at a temperature of about 90°C, which agree with a temperature of about 93°C for the absorbing solution, as mentioned in the description. Under these conditions, the desired degree of regeneration of 5 percent is reached.

The heat supply required in the regeneration stage is 21.00 million kcal/hour, which corresponds to 2450 m$^3$ of methane/hour. This gives a total consumption of 810 kcal/Nm$^3$ of $CO_2$. These values are based directly on the calorific value of methane.

In this case also, with the use of burners that yield oxygen-free combustion gases, one does not find the disadvantage of oxidation of the arsenite, to arsenate that occurs on regeneration with air in accordance with the known process b) mentioned in the introduction of the specification.

EXAMPLE 3

Example 2 is repeated, but an absorption solution that consists of an alkali metal carbonate solution (250 g of $K_2O$/litre) activated with 50 g of glycine/litre is used. The absorption tower 16 again operates by the split-stream process, i.e. one third of the stream is fed at 60°C into the top of the absorption tower 16, while the remaining two thirds are introduced into the absorption tower at 90°C at a point in its central part. To achieve purification to a $CO_2$ content of 0.1 percent at a temperature of 60°C, a solution with a $CO_2$ saturation of 26 percent is supplied to the absorption tower 16.

The temperature of the solution at the bottom of the absorption tower 16 is about 95°C, and the $CO_2$ saturation is 76.5 percent, which corresponds to a specific loading of 30 vol. of $CO_2$/vol. of solution. The flow rate of the solution is 860 m$^3$/hour. The exhausted absorption solution emerging from the absorption tower 16 at a temperature of 95°C is fed into the top of the regeneration tower 12 in countercurrent to the combustion gases as described in Examples 1 and 2. These gases saturated with water vapour are introduced at 90°C. The degree of regeneration is 26 percent.

The quantity of heat to be supplied in the regeneration stage is 21.00 million kcal/hour, corresponding to 810 kcal/Nm$^3$ of $CO_2$. These values are based directly on the calorific value of methane.

It is observed that if solutions activated with glycine are used, oxidation is avoided even when gases with an oxygen content of about 1 to 2 percent are used.

EXAMPLE 4

A gas stream of 30,000 m$^3$/gour, which contains 15 percent of $CO_2$ and 15 g of $H_2S$/Nm$^3$ as impurities, is purified at a pressure of 40 atm with a 15 percent monoethanolamine solution in an apparatus in accordance with FIG. 4.

The absorption tower 16 operates practically at ambient temperature, i.e. at 25° to 30°C. The heat exchanger 19 and the cooler 18 are therefore used. 163 m$^3$/hour of solution with a $CO_2$ saturation of 1.50 vol. of $CO_2$/mole of monoethanolamine is introduced into the top of the absorption tower 16 at a temperature of 25° to 30°C. The gas to be purified is purified to a $CO_2$ content of about 0.1 percent as an $H_2S$ content of 80 ppm.

In the lower part of the absorption tower, the solution reaches a $CO_2$ saturation (12.2 vol. of $CO_2$/mole of monoethanolamine and 1.0 vol. of $H_2S$/mole of monoethanolamine) of 13.2 vol./mole of monoethanolamine. After being preheated to about 80°C in the heat exchanger 19, this solution is fed into the regeneration tower 12 and led in countercurrent to the mixture of water vapour and combustion gases coming from the quenching chamber 10. In the burner 1, 685 m³ of methane is burnt with the stoichiometrically required quantity of air, and an oxygen-free combustion gas is obtained. The gas mixture at 90°C is obtained in a quantity of 20,000 m³/hour of water vapour and combustion gases, and after regeneration of the solution in the tower 12, the gas mixture is led out together with the $CO_2$ and $H_2S$ desorbed from the solution. The solution at about 90°C, after passage through the heat exchanger 19, the pump 15, and the cooler 18, is returned to the absorption tower 16. The heat consumption is 1260 kcal/Nm³ of absorbed $CO_2 + H_2S$, corresponding to 35,600 kcal/m³ of solution. These values are considerably lower than in the known processes.

We claim:

1. In a process for removing an acidic gas of the group of carbom dioxide and hydrogen sulphide from a gaseous mixture by absorbing the acidic gas by means of an aqueous absorbing solution in an absorption stage, transferring the fouled solution to a regeneration stage in which the absorbed acidic gas is removed from the solution, and recirculating the regenerated solution to the absorption stage, the improvement comprising regenerating the solution in the regeneration stage by burning a combustible substance in direct contact with the solution or water thereby to obtain a mixture of combustion gases and water vapour, and intimately contacting the latter mixture with the solution to be regenerated thereby to remove therefrom the absorbed acidic gas.

2. The process of claim 1, wherein the combustible substance is burnt with the use of a gas containing molecular oxygen in a proportion less than 21 percent.

3. The process of claim 1, wherein the combustible substance is burnt with the use of a gas containing molecular oxygen in a proportion stoichiometrically required for the combustion.

4. The process of claim 1, wherein the combustible substance is burnt with the use of a gas containing molecular oxygen and water vapour.

5. The process of claim 1, wherein the fouled solution is first partly regenerated by desorption with water vapour and the remaining amount absorbed acidic gas is removed in the manner defined by claim 1.

* * * * *

UNITED STATES PATENT AND TRADEMARK OFFICE
CERTIFICATE OF CORRECTION

PATENT NO. : 3,897,227
DATED : July 29, 1975
INVENTOR(S) : Giuseppe GIAMMARCO, Paolo GIAMMARCO It is certified that error appears in the above-identified patent and that said Letters Patent are hereby corrected as shown below:

IN THE HEADING:

Under "ASSIGNEE", ADD THE FOLLOWING NAME:

Part interest to Giuseppe Giammarco
Venice, Italy

Signed and Sealed this sixth Day of April 1976

[SEAL]

Attest:

RUTH C. MASON
Attesting Officer

C. MARSHALL DANN
Commissioner of Patents and Trademarks